Jan. 9, 1951     I. I. FRIEDMAN ET AL     2,537,043
METHOD FOR SYNTHESIZING LARGE
SINGLE CRYSTALS OF QUARTZ
Filed April 29, 1948
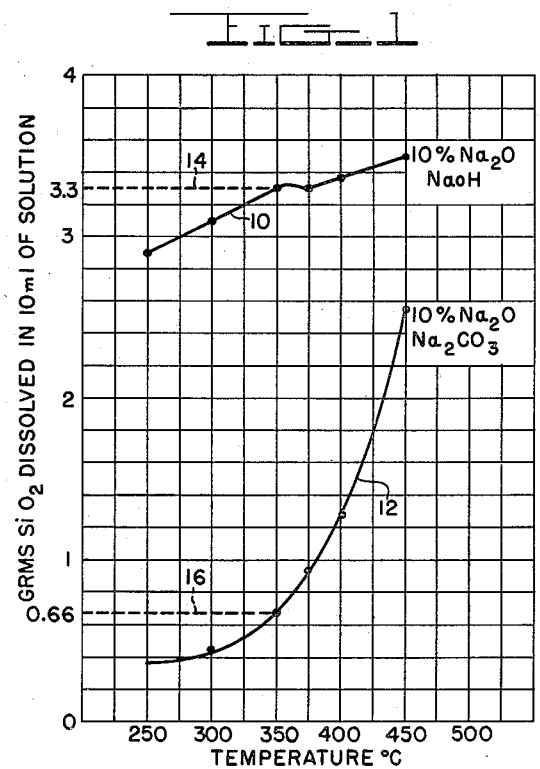
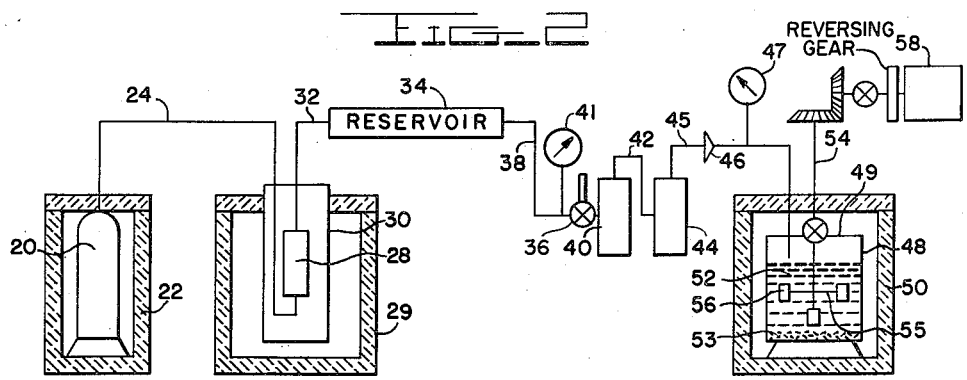
*INVENTORS*
ISIDORE I. FRIEDMAN
PAUL H. EGLI
BY
*ATTORNEY*

Patented Jan. 9, 1951

2,537,043

UNITED STATES PATENT OFFICE 2,537,043

METHOD FOR SYNTHESIZING LARGE SINGLE CRYSTALS OF QUARTZ

Isidore I. Friedman, Chicago, Ill., and Paul H. Egli, Washington, D. C.

Application April 29, 1948, Serial No. 24,024

3 Claims. (Cl. 23—301)

(Granted under the act of March 3, 1883, as amended April 30, 1928; 370 O. G. 757)

This invention relates to a method and apparatus for quartz crystallization from an alkali-water-silica system and in particular to a method for increasing the yield of quartz from such a system.

The general object of the invention is to grow large single crystals of quartz by crystallization from an alkali-water solution of silica.

It is also an object of the invention to increase the yield of quartz from a supersaturated solution of silica over that obtainable by mere supercooling.

It is a further object of the invention to grow such crystals efficiently and at a rate of growth which is compatible with the formation of crystals free of flaws.

It is a still further object of the invention to provide apparatus which is suitable for carrying the various steps of the crystallization process into effect.

Other objects will be apparent to those skilled in the art from the following description and from the drawings hereto appended which are merely illustrative of a preferred embodiment of the applicants' invention and are not limitative thereof and in which;

Figure 1 is a graphic illustration of the solubility, in grams per ten ml. of solution, of silica in aqueous solutions containing ten per cent $Na_2O$ introduced as NaOH and $Na_2CO_3$, respectively, as a function of the temperature.

Figure 2 is a schematic arrangement of apparatus for carrying the applicants' invention into effect.

Referring to Figure 1, here is shown at 10 a curve indicating the grams of silica dissolved in ten ml. of a ten percent solution of soda introduced as sodium hydroxide through a temperature range of from 250° C. to 450° C. Curve 12 shows the solubility in grams per ten ml. of solution of silica in a 10 percent solution of soda introduced as sodium carbonate, through the same temperature range. Curve 12 approaches curve 10 with increasing rapidity from and above the temperature of about 350° C. The difference in the amount of silica dissolved in the two solutions is almost constant and at a maximum from about 250° C. to about 350° C. It is this maximum difference temperature range of these two curves shown by dash lines 14 and 16 with which the applicants' invention is concerned. Obviously, if in an equilibrated solution of silica in sodium hydroxide the latter compound can be converted to the carbonate, a relatively large amount of the silica will be forced out of solution and will crystallize out as quartz if the concentration of the three components is within the area $H_2O$ apex-$Na_2O$-$SiO_2$ apex as defined in Figures 1 to 3 in the copending application of Tuttle and Friedman, Serial No. 37,176, filed July 6, 1948. The concentration of the components at a temperature of 350° C. is, as indicated by curve 10;

|        | Percent by weight |
|--------|-------------------|
| $Na_2O$ | 10 |
| $SiO_2$ | 33 |
| $H_2O$ | 57 |
|        | 100 |

This concentration is well within the area of quartz crystallization as defined in the above cited copending application.

Referring further to the solubility curves of Figure 1, it is seen that at 350° C. a ten percent solution of $Na_2O$ introduced as sodium hydroxide will dissolve 3.3 grams of silica per ten ml. of solution; that at this same temperature a ten percent solution of $Na_2O$ introduced as the carbonate will dissolve .66 gram of silica per ten ml. of solution. Thus it is apparent that by converting the hydroxide solution to the carbonate the difference of these solubilities, viz., 2.64 grams of silica per 10 ml. of solution will be forced out of solution. This silica will crystallize out as quartz if the concentration of the solution is as above indicated. A further study of the solubility curve shows that if the sodium hydroxide solution of silica be cooled from 350° C. to about 250° C. approximately 0.4 gram of silica will crystallize out as quartz per ten ml. of solution. If the sodium hydroxide solution is converted to the carbonate solution and cooled to approximately 250° C. the total yield of quartz will be 2.92 grams per ten ml. of solution. The increased yield by conversion over crystallization directly from the hydroxide solution is thus readily apparent.

The applicants have found that the sodium hydroxide solution of silica may be readily converted to the carbonate solution by pumping or forcing carbon dioxide into the solution. This conversion takes place in accordance with the equations:

$$2NaOH + CO_2 \rightarrow Na_2CO_3 + H_2O \qquad (1)$$

and

$$Na_2Si_2O_5 + CO_2 \rightarrow Na_2CO_3 + 2SiO_2 \qquad (2)$$

Equation (2) shows the conversion of sodium bisilicate to the carbonate by reaction with carbon dioxide. The silica in solution must be in combination with the soda in the form of sodium bisilicate or higher silicate combination in order that the silica may crystallize out of solution as quartz. This fact is also shown and explained in the copending application cited supra.

The applicants have also found that by pumping or forcing more carbon dioxide into the solution than that required by equation (1) the sodium hydroxide is converted to sodium bicarbonate as expressed by the following equation:

$$NaOH + CO_2 \rightarrow NaHCO_3 \quad (3)$$

and that by way of illustration that sodium carbonate on an equivalent basis will dissolve more silica than the bicarbonate as shown by the following equation:

$$Na_2CO_3 + 3SiO_2 \rightleftarrows Na_2Si_3O_7 + CO_2 \quad (4)$$
$$2NaHCO_3 + 3SiO_2 \rightleftarrows Na_2Si_3O_7 + H_2O + 2CO_2 \quad (5)$$

Equations (4) and (5) are reversible. Therefore by pumping $CO_2$ into the solution the solvent reaction is reversed and the dissolved silica crystallizes out as quartz.

The conversion of the dissolved material to silica and the solvent solution to the carbonate and preferably to the bicarbonate constitutes the essence of the applicant's invention. The crystallization of quartz from solution according to the applicants' method comrises a series of related steps which are dependent upon each other and which are carried out under close control as to rate, temperature, pressure and concentration.

The invention further includes an arrangement of apparatus for performing the various steps of the method. This arrangement which is illustrated diagrammatically in Figure 2 of the drawings comprises a storage tank for $CO_2$ 20 which is supported and contained in a refrigerator or heat exchanger 22. Tank 20 is connected by heavy tubing 24, to boiler 28 which is contained in and supported by muffle furnace 29. This furnace is provided with a muffle 30. Boiler 28 is connected by heavy tubing 32, reservoir 34 and heavy tubing 38 to the first member 40 of a pair of magnetically operated valves 40 and 44. Tubing 38 is provided with a pressure reading gauge 41 and atmospheric vent valve 36. Magnetic valves 40 and 44 are connected by heavy tubing 42. They are arranged so that a definite volume of gas is contained between them. They may be operated either by hand or preferably by a clock mechanism (not shown) so that gas may be passed on at a definite rate. Magnetic valve 44 is connected by tubing 45 and check valve 46 to reaction chamber 48 which is supported and contained in furnace 50. This furnace may be heated electrically or by any other means which will give a controlled, uniform heat distribution. Chamber 48 contains silicate solution 52 which at the beginning of the operation is the sodium hydroxide-silica solution defined supra. Quartz fragments 53 may be placed in the bottom of chamber 48 to be dissolved in the sodium hydroxide in preparation of the solution. But this is not necessarily so since the solution may be prepared by the addition of silica gel, finely ground quartz glass or a higher silica content sodium silicate to the hydroxide. Chamber 48 is provided with a rotatable shaft 54 which is positioned on the vertical axis of the chamber and extends upwardly through the cover thereon. Shaft 54 is provided with radial arms 55 on the extremities of which are mounted seed crystals 56. Shaft 54 is provided at its upper end with driving means 58 which is adapted to rotate the shaft periodically first in a clockwise and then in a counterclockwise direction.

The operation of the applicants' method and apparatus is as follows: A ten liter solution of sodium hydroxide is prepared by adding about one thousand and thirty grams of sodium hydroxide to ten liters of water. To this solution is added about three hundred and thirty grams of silica which may be derived from finely ground quartz glass, quartz fragments, silica gel or from the higher silica content water glasses. In case of deriving the silica from water glasses care must be exercised in order to keep the total soda content of the solution below about twenty percent by weight. The solution is then placed in the reaction chamber 48 in furnace 50, shaft 54 with seed crystals 56 supported thereon is placed in position and cover 49 is then tightly sealed on the reaction chamber. Heat is then applied to the reaction chamber by means of furnace 50 to raise the temperature uniformly to about 325° C. The solution is held at this temperature for from ten to twenty-four hours to allow the solution to come to equilibrium and to redissolve any spontaneous nuclei of crystallization which may have formed. Shaft 54 is now rotated by driving means 58 and the solution in reaction chamber 48 is cooled slowly (at the rate of about two degrees per hour) to about 250° C. During this period the excess of silica soluble in the sodium hydroxide crystallizes out on the seed crystals as quartz. Carbon dioxide is now introduced into the solutions as follows: vent valve 36 is opened to allow the system up to the vent valve to become filled with carbon dioxide. Boiler 28 is now heated by furnace 29 to a temperature at which the pressure on the carbon dioxide will be about five hundred pounds per square inch higher than the pressure in reaction chamber 48. These pressures are shown on gauges 41 and 47 respectively. Up to this point in the process magnetic valves 40 and 44 have been closed. Valve 40 is now opened, valve 44 remaining closed, to bring the pressure on the $CO_2$ gas between these two valves up to that indicated by gauge 41. Valve 40 is now closed and valve 44 is opened to permit the gas between the two valves to expand through heavy tubing 45 into the reaction chamber. Since a definite volume of gas is contained between the two valves, upon its expansion against the lower pressure, a definite quantity of the carbon dioxide gas will be forced into the reaction chamber. Magnetic valves 40 and 44 may be operated manually, but they are preferably operated by electrical switches controlled by clock-work so that the gas may be fed into the reaction chamber at a definite rate. The forcing in of the carbon dioxide is continued until the sodium hydroxide is converted to the bicarbonate of soda and the sodium silicate is converted to the bicarbonate of soda with the formation of free silica, the excess of which crystallizes out as quartz. The operation is repeated, using the same seed crystals, until crystals of the desired size are grown.

While the applicants have described a particular arrangement of apparatus as the preferred embodiment of their invention they do not desire to be strictly limited thereto since other means such as a pumping mechanism for introducing the carbon dioxide may be used with equivalent effect and without departing from the spirit and scope of the invention. Such modifications are intended to be included as coming within the scope of the invention to the extent as defined by the herewith appended claims.

The invention herein described may be made and used by or for the Government of the United States of America for governmental purposes without the payment of any royalty thereon or therefor.

What is claimed:

1. The method of growing large single crystals of quartz on seed crystals rotatably mounted within the following defined solution, comprising preparing a solution of silica in an alkali metal hydroxide at a temperature within the range of 350° C. to 450° C., equilibrating the solution at a temperature within this temperature range for a period of time, cooling the solution at a predetermined rate to a temperature about fifty to one hundred and fifty degrees C. below the temperature of equilibration, forcing carbon dioxide into the solution at a slow rate of flow and in sufficient quantity to convert the alkali metal hydroxide and the alkali metal silicate to alkali metal bicarbonates and free silica which precipitates out of said solution as quartz on said seed crystals and repeating these method steps using the same seed crystals until crystals of the desired size are grown.

2. The method of growing large single crystals of quartz on rotatably mounted seed crystals of quartz, comprising preparing an aqueous solution of ten percent by weight of soda introduced as sodium hydroxide in sufficient volume to cover said seed crystals, dissolving in this solution from about twenty nine to about thirty five percent by weight of silica derived from one of the following sources consisting of fragmental quartz, finely ground quartz glass, silica gel and a sodium silicate higher in silica content than sodium bisilicate, heating the solution to a temperature within the range of from about 250° C. to about 450° C. equilibrating the solution at the solution temperature for a period of time of from ten to twenty four hours, cooling the equilibrated solution at a rate of about two degrees per hour to a temperature of from fifty to about one hundred and fifty degrees below the temperature of equilibration, forcing carbon dioxide at a relatively slow rate of flow into the said solution to convert the sodium hydroxide and the sodium silicate, formed by the reaction of the silica with the sodium hydroxide, to the bicarbonate of soda and free silica, the excess of which over that soluble in the bicarbonate at the temperature of conversion precipitates out of solution as crystalline quartz on said seed crystals and repeating the method using the same seed crystals until crystals of the desired size are grown.

3. The method of growing large single crystals of quartz on rotatably mounted seed crystals of quartz, comprising preparing an aqueous solution of ten percent by weight of soda introduced as sodium hydroxide in sufficient volume to cover said seed crystals, dissolving in this solution from about twenty nine to about thirty five percent by weight of silica from one of the following sources consisting of fragmental quartz, finely ground quartz glass, silica gel and a sodium silicate higher in silica content than sodium bisilicate, heating the solution to approximately 350° C., equilibrating the solution at this temperature for a period of time of from ten to twenty four hours, cooling the equilibrated solution at a rate of about two degrees per hour to a temperature of about 325° C., forcing carbon dioxide at a relatively slow rate of flow and in sufficient quantity to convert the sodium hydroxide and the sodium silicate, formed by the reaction of the silica with the sodium hydroxide, to the bicarbonate of soda and free silica, the excess of which over that soluble in the bicarbonate at the temperature of 325° C. precipitates out of solution as quartz on said seed crystals, cooling the bicarbonate solution to a temperature of about 250° C. to produce a further precipitation of quartz and repeating the method using the same seed crystals until crystals of the desired size are grown.

ISIDORE I. FRIEDMAN.
PAUL H. EGLI.

REFERENCES CITED

The following references are of record in the file of this patent:

UNITED STATES PATENTS

| Number | Name | Date |
|---|---|---|
| 61,931 | Fleury | Feb. 12, 1867 |
| 1,409,607 | Stevens | Mar. 14, 1922 |
| 1,430,900 | Haferkamp | Oct. 3, 1922 |
| 1,843,576 | McClure | Feb. 2, 1932 |
| 2,386,337 | Moyer | Oct. 9, 1945 |
| 2,424,273 | Haas | July 22, 1947 |